United States Patent [19]
Moreland

[11] Patent Number: 5,977,018
[45] Date of Patent: Nov. 2, 1999

[54] REACTIVE PAPER AND INK FOR INDELIBLE PRINT

[75] Inventor: Richard B. Moreland, Centerville, Ohio

[73] Assignee: NCR Corporation, Dayton, Ohio

[21] Appl. No.: 08/885,721

[22] Filed: Jun. 30, 1997

[51] Int. Cl.⁶ ..................................................... B41M 5/00
[52] U.S. Cl. ........................... 503/201; 428/195; 428/413; 428/914; 503/227
[58] Field of Search ..................................... 428/195, 413, 428/914; 503/201, 227

[56] References Cited

U.S. PATENT DOCUMENTS

| | | | |
|---|---|---|---|
| 3,663,278 | 5/1972 | Blose et al. | 428/480 |
| 4,694,302 | 9/1987 | Hackleman et al. | 346/1.1 |
| 4,923,749 | 5/1990 | Talvalkar | 428/341 |
| 4,950,696 | 8/1990 | Palazotto et al. | 522/25 |
| 5,006,862 | 4/1991 | Adamic | 346/1.1 |
| 5,139,860 | 8/1992 | Mori | 428/264 |
| 5,437,964 | 8/1995 | Lapin et al. | 430/280 |

*Primary Examiner*—Bruce H. Hess
*Attorney, Agent, or Firm*—Millen White Zelano & Branigan PC

[57] ABSTRACT

Paper and ink, each having a reactive component of a two part epoxy system, provide documents with print which is resistant to mechanical and chemical alteration. When the paper and ink are used in a printing process, the reactive components of the epoxy system form a thermoset polymer that fuses the ink to the paper. Money orders, checks, legal documents and transaction receipts resistant to alteration are provided.

13 Claims, No Drawings

5,977,018

REACTIVE PAPER AND INK FOR INDELIBLE PRINT

FIELD OF THE INVENTION

This invention relates to printing systems with security measures that provide print which is resistant to alteration. More particularly, the present invention relates to papers and inks with reactive components therein which provide printed media with images resistant to chemical and mechanical alteration by reacting these components.

BACKGROUND OF THE INVENTION

Many different means of security are available to prevent duplication of printed commercial documents, such as water marked paper and fluorescent inks which form latent images. The use of latent images as a security measure is well known but has limited utility where original documents are altered or modified. Fraudulent manipulation of print on issued money orders, checks, transaction receipts and legal documents is a significant problem. Alteration and modification of conventional print is possible in that the conventional inks employed typically comprise pigments/dyes and binders which are soluble within aqueous and/or organic solvents. For example, in ink jet printing, impact printing and relief printing, the pigment or dye is disposed within a solvent carrier which is subsequently evaporated and/or absorbed in the paper to cure the ink. The solubility characteristics of the pigments, dyes and binder provide for weak or reversible bonds to the recording medium. In addition, many techniques require certain coatings on the fibrous web or base sheet of papers to provide high print density and print with high definition. Such coatings also enable modification of print on the paper in that they typically form a barrier between the ink and the fibrous web of the paper and comprise components which are soluble in aqueous or organic solvents. This enables removal of portions of the coating with print thereon or the print itself.

The use of reactive components in inks and paper to improve the quality (water-fastness and smear resistance) of prints from inks is known. Examples of such inks and papers are described in the following references.

U.S. Pat. No. 5,006,862, issued to Adamic et al., describes the use of reactive dyes which attach to a chromophore wherein the prints are treated with a strong base to improve water-fastness and smear-resistance.

U.S. Pat. No. 5,139,860, issued to Mori, describes papers containing urethane resins and epoxy resins usefull in forming thin papers for heat-sensitive stencil printing.

U.S. Pat. No. 4,694,302, issued to Hackleman et al., describes a method of increasing the water fastness and print quality of an ink employed in ink jet printers with the use of a reactive species that react with a cellulose component in the substrate or added thereto to form a polymer that binds the dye in the ink to the polymeric lattice.

There is still a need for a printing system which produces printed media which cannot be modified, either chemically or mechanically, without detection.

SUMMARY OF THE INVENTION

It is an object of the present invention to provide a recording medium and an ink formulation with reactive components that provide strong, irreversible bonds between the cured ink and the paper.

It is another object of the present invention to provide a kit comprising a paper recording medium and an ink formulation for producing printed media with print which is resistant to chemical and mechanical manipulation.

It is an additional object of the present invention to provide printed media comprising a recording medium with a reactive component therein and a printed image thereon which is resistant to chemical manipulation and mechanical manipulation.

Other objects of this invention will become apparent from the detailed disclosure and claims which follow.

The above objects are achieved through the recording media, ink formulations, kits, and printed media provided by this invention.

The recording medium provided by this invention comprises a fiber web and from 2–10 wt. %, based on the total weight of the recording medium, of a solid epoxy compound which is reactive with a hardener at ambient temperature. The recording medium may optionally contain filler and/or a binder and is preferably paper.

The ink formulation of this invention comprises a colorant (pigment and/or dye), a carrier for the colorant and a hardener/crosslinker for an epoxy compound in an amount of from 2 to 10 wt. %, based on the total weight of said ink formulation.

The kit of this invention is for preparing printed media with print that is resistant to chemical and mechanical manipulation. The kit comprises a) a paper with one component of a two component epoxy/hardener pair incorporated therein which is solid at ambient temperature, and b) an ink which comprises a colorant, a carrier for said colorant and the other component of said two component epoxy/hardener pair.

The printed medium of this invention comprises a recording medium with a solid reactive epoxy compound incorporated therein and a printed image thereon. The printed image is resistant to chemical manipulation and mechanical manipulation and is derived from an ink which contains a hardener/crosslinker for the solid epoxy. The image comprises a reaction product of the epoxy compound and hardener/crosslinker.

The recording medium of the present invention can be in the form of paper, cardboard, label stock and hard board. Paper recording media are preferred and those adapted for use in printing processes such as ink jet printing, impact printing, dot matrix printing and thermal transfer printing are most preferred, particularly in the form of blank money orders, blank checks, blank legal forms and blank transaction receipts.

The recording medium preferably contains a fiber web as a primary component. The fiber web provides an excellent anchoring site for the colorants (pigment/dye) within inks. These fibers are preferably comprised of wood fibers or other cellulose fibers conventionally used in paper manufacture and include chemical pulps such as LBKP or NBKP, mechanical pulps such as GP, PGW, RMP, TMP, CTNP, CMP or CGP and waste pulp such as DIP. However, glass, synthetic and other natural fibers may also be used, either alone or in fiber mixtures. The amount of fiber can vary widely and typically falls within the range of 60–98 wt %, based the total weight of the recording medium. Non-fibrous media such as transparent polyester films (Mylar®) which can incorporate sufficient epoxy compound to provide reactive sites at the surface may be used but are not preferred.

A paper recording medium consistent with this invention may be produced by mixing, in solution, the fibers that form the fiber web with an epoxy compound. Where optional fillers, binders and/or other additives are used, they are typically mixed in solution as well. A paper is made from the resulting mixture by a conventional paper former, such as a cylinder paper machine, twin wire paper machine (Fourdrinier Yankee cylinder) or the like and dried. Preferably, the paper is maintained at about 130° C. and is wound on a roll. The paper may optionally be smoothed by conventional techniques such as calendaring or hot pressing.

An alternative method for preparing the recording medium of the present invention, particularly where low molecular weight epoxy compounds are used, is to impregnate the fiber web of a recording medium, preferably without filler, with a solution or emulsion of the epoxy compound and dry the fiber web by a hot air drier or a hot roll. The drying temperature can range from 50–210° C.

The coat weight of the recording medium is not limited and can vary widely but preferably is of sufficient density to permit printing using conventional printing equipment and not too heavy to inhibit such printing. For paper recording media, the base weight can range from 10 $g/m^2$ to 100 $g/m^2$.

The recording medium may optionally contain conventional fillers and binders used in paper and typically contains white pigments as fillers, such as precipitated calcium carbonate, talc, kaoline, ground calcium carbonate, clay, titanium dioxide, zeolites, zinc oxide, white carbon, calcium silicate, magnesium silicate, calcium sulfate, barium sulfate, zinc sulfate, magnesium carbonate, mixtures thereof and the like. Typically, the filler is used in an amount of from 2–35 wt. % to fill voids in the paper and enhance the appearance of the printed image.

As optional binders for the paper recording medium, there may be used those conventionally known in the art such as polyvinyl alcohol, vinyl acetate, oxidized starch, cellulose derivatives such as carboxymethylcellulose and hydroxyethylcellulose, soy bean protein, acrylic polymer latexes, vinyl polymer latexes such as ethylene-vinyl acetate copolymer, and others described in EP 0 602 400 A1.

Additional conventional additives for paper that may also be incorporated in the recording medium include pigment dispersants, thickening agents, fluidity improvers, defoamers, foam inhibitors, foaming agents, color dyes, coloring pigments, fluorescent brighteners, ultraviolet absorbers, antioxidants, preservatives, slimecides, water proofing agents, wet strengthening agents and dry strengthening agents.

The amount of epoxy compound added to the fiber web to form a recording medium can range widely and preferably falls in the range of 2–10 wt.%, most preferably 4–8 wt. %, based on the total weight of solids in the recording medium. Higher or lower concentrations of epoxy compound may inhibit or limit binding of the pigments/dyes directly to the fibers within the fiber web.

Examples of epoxy compounds useable in the present invention are those which are solid and reactive at ambient temperature. Those which are reactive at ambient temperature typically contain two or more oxirane rings in a molecule. Those which are solid typically have a molecular weight in the oligomer range and higher but some high molecular weight monomers may be mentioned as suitable for incorporation into a recording medium of this invention, particularly if mixed with other epoxy compounds.

Suitable epoxy compounds can be grouped in accordance with their chemical structure into the following types: glycidyl ether, glycidyl ester, glycidyl amine, alycyclic epoxide and linear aliphatic epoxide types, etc. Illustrative examples are:

1. polyglycidyl esters obtained by reaction of a compound containing at least two carboxyl groups and epichlorohydrin or glycerol dichlorohydrin or β-methyl epichlorohydrin;
2. polyglycidyl ethers which are obtainable by reacting a compound containing at least two free alcoholic hydroxyl groups and/or phenolic hydroxyl groups in the molecule with a suitably substituted epichlorohydrin under alkaline conditions or in the presence of an acid catalyst and subsequent treatment with alkalide epoxy compounds derived from mononuclear phenols such as resorcinol and hydroquinone can also be used;
3. poly(N-glycidyl) compounds obtained by dihydrochlorination of the reaction products of epihydrochlorin with amines; and
4. poly-S-glycidyl compounds derived from dithiols such as 1,2-ethane-dithiol.

Particularly preferred epoxy resins are polyglycidyl ethers of bisphenols, such as bisphenol A or bis(4-hydroxyphenol) methane. Examples of resins which are commercially available include glycidyl ether-type resins derived from bisphenol A, hydrogenated bisphenol A, brominated bisphenol A, bisphenol-F, o-cresol novolak resins, phenol novolak resins, polyalcohol and polyglycol. Others include polyglycidyl amine), epoxy-modified polyol, glyoxal, glycidyl ester of a dimer acid, epoxy resins modified by a dimer acid or acrylic acid, glycidyl ester of a tertiary aliphatic acid, etc., cyclohexeneoxide, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, bis(3,4-epoxy-6-methylcyclohexylmethyl)adipate, dicyclopentadiene dioxide, epoxidized polybutadiene, 1,4-butanediol diglycidyl ether, polyglycidyl ether of phenolformaldehyde resole or novolak resin, resorcinol diglycidyl ether, epoxy silicones, e.g., dimethylsiloxanes having cycloaliphatic epoxide or glycidyl ether groups, aliphatic epoxy modified with propylene glycol and dipentene dioxide.

A wide variety of commercial epoxy resins are available and listed in "Hand-book of Epoxy Resins" by Lee and Neville, McGraw Hill Book Company, New York (1967) and in "Epoxy resin Technology" by P. F. Bruins, John Wiley & Sons, New York (1968). Those available from Elf Atochem under the tradename Vikopol™ from Union Carbide under the tradenames UVR™ and Cyracuse™ and Sarcat™ from Sartomer, which are solid and react at ambient temperature are also suitable.

Other examples of suitable epoxy monomers and oligomers include the "1,2-cyclic ethers" disclosed in U.S. Pat. No. 5,437,964 and those described in *Ring Opening Polymefization*, vol. 2, Frisch and Reegen, Marcel Dekker, Inc., which are solid and react at ambient temperature. Any one of these epoxy compounds can be used singly or in combination.

In some embodiments, it is preferable to provide an epoxide functionality of greater than 2. Epoxy resins with epoxide functionality of at least 2.5 include epoxy cresol novolaks made available by Ciba Geigy Co., such as ECM 1235 (epoxide functionality of 2.7), ECM 1273 (epoxide functionality of 4.8) and others.

The epoxy compound is preferably reactive at ambient temperature with conventional hardness/crosslinkers for epoxy resins. These include anhydrides, amines, diamines, aliphatic polyamines, diamides, aliphatic polyamides, polysulfides, dianhydrides, phenol-formaldehyde condensates, aromatic amines, melamine, urea, phenol novolak resins and modified amines (polymer) and the like.

Preferred hardeners/crosslinkers are dodecnyl succinic anhydride and Amicure DBU. The modified amines are typically prepolymers or oligomers of an amine having at least two primary or secondary amine groups. Examples of suitable modified amines are sold under the trade name EPI-CURE P101® and Ancamine 2014 FG® sold by Shell chemical Co. and Air Products, respectively.

The ink formulations of the present invention can vary widely in composition depending on the printing process intended. Inks suitable for ink jet printing, impact printing, dot matrix printing, thermal transfer printing, relief printing (flexographic), gavure printing, silk screen printing, lithography and electrophotographic printing Oaser, photocopies and fax machine) are included. Those for use in impact printing, dot matrix printing and thermal transfer printing will be incorporated on a ribbon or similar substrate.

Conventional colorants and carriers for these colorants can be used. Suitable colorants include organic and inorganic dyes and pigments. Examples include acidic dyes, basic dyes, reactive dyes, food dyes, phthalocyanine dyes, carbon blacks, fluorescent naphthalimide dyes and others such as cadmium, primrose, chrome yellow, ultra marine blue, iron oxide, zinc oxide, titanium oxide, cobalt oxide, nickel oxide, etc. Other examples of colorants include those described in U.S. Pat. No. 3,663,278 and U.S. Pat. No. 4,923,749. The total amount of colorant within the ink can vary widely and depend on end use. Amounts conventional for the intended printing process are suitable. For example, inkjet inks, typically have from 1 to 10 wt. % colorant in liquid formulation. Thermal transfer ribbons typically have 1–10 wt. % colorant in the transfer layer. Ink formulations disposed on ribbons for impact printing and dot matrix printing may have higher levels.

The carriers employed for the colorant vary widely depending on the end use intended. For example, ink jet inks employ a liquid carrier, typically alcohols and ketones which aid or enable the ink to be jettisoned. Inks for impact printing may be liquid and/or solid carriers such as plasticizers, polymers and waxes. Carriers which are conventional for the end use intended are suitable. Where solvents are suitable, there can be used, water, water soluble organic solvents, $C_{1-4}$alkyl alcohols, dimethyl formamide, ketones (acetone) ethers (tetrahydrofuran), polyalkylene glycols and alkylene glycols.

Additives conventional for the intended use of the ink formulation are also suitable. For example, ink jet printing inks may include stabilizers, surfactants and defoaming agents, pH buffers, viscosity modifiers, surface active agents, etc.

Other suitable additives desired for jet ink printing are those which reduce bacterial growth (Iowisyl 75), modify viscosity which provide wettability (butylcarbitol), humectants which prevent the composition from drying out within the print head (polyethylene glycols), which enhance the conductivity of the ink formulation for use in continuous ink jet printers and photostabilizers which prevent polymerization of inks by natural or ambient light where the photoinitiator is activated by UV radiation.

Plasticizers such as those described in U.S. Pat. No. 3,663,278, may also be used to aid flexibility of the image formed and/or reduce the viscosity of the ink. Suitable plasticizers include adipic acid esters, phthalic acid esters and ricinoleate acid esters, citrates, epoxides, glycerols, glycols, hydrocarbons and chlorinated hydrocarbons, phosphates and the like. Other suitable additives include oil, weatherability improvers such as UV light absorbers, flexibilizers (oil) and fillers.

Where the ink formulation is to be used in a thermal ink jet printer, it contains a propellant, which is typically a low boiling liquid such as a low molecular weight alcohol or water. The amount of propellant can range from 10 to 95 wt. % of the total ink formulation. Amounts above 10 wt. % can be used where the propellant participates in the reaction or evaporates on the substrate. Preferably, the propellant comprises about 75 wt. % of the total ink formulation.

The above reciped components can be mixed and dispersed uniformly by an appropriate means such as a simple impeller within a vessel or a roll mill to obtain the ink composition of the present invention. Other alcohols such as methanol, ethanol, isopropanol, and tert.butanol can also be used.

The ink formulation of the present invention includes a hardener/crosslinker for epoxy compounds as described above. The hardener/crosslinker is typically present in a concentration of about 2–10 wt. %, preferably 4–8 wt. %, based on the total weight of the ink formulation. The hardener/crosslinker is preferably reactive at ambient temperature. The hardener selected will depend on the epoxy compound to be reacted with, the printing process to be employed and other components of the ink formulation to maintain solubility.

The ink formulation may further include other polymers to impart improved properties. For example, formulations for thermal transfer ribbons preferably comprise additional thermoplastic resin in an amount of from about 5–30 wt. % based on total weight of solids.

If desirable, the ink formulation may contain a curing accelerator to increase the cure rate, i.e., print speed of the paper/ink combination. Such accelerators typically include the conventional Lewis acid complexes.

The kits of the present invention comprise a combination of paper and an ink formulation which provide printed media that is resistant to chemical and mechanical manipulation. The papers and ink formulations include those described above and others. Since the paper and ink are used in combination, the paper may include the hardener/crosslinker for an epoxy system where solid at ambient temperature. These can include the modified amines described above. The ink formulation would correspondingly contain an epoxy compound which is reacted an ambient temperature, but need not be solid. The paper and ink formulation need only contain one component of a two-component epoxy/hardener pair, the epoxy and hardener/crosslinker being selected from those described above.

The papers and ink formulations preferably contain amounts of hardener and epoxy compound which are matched. Preferred levels of hardener/crosslinker range from 2–10 wt. % based on the total weight of the ink and 2–10 wt. % epoxy compound based on total solids within the paper. However, the kits are not limited to papers and ink formulations with these amounts of hardener/crosslinker and epoxy compound. The combination of epoxy compound and hardener preferably provide a molar ratio of epoxide groups to reactive groups on the hardener, such as N—H groups or anhydride groups, within the range of about 0.3:1 to 1.8:1, and preferably from 0.4:1 to 0.8:1.

The printed medium of this invention can be prepared by the kits described above. The printed medium comprises a recording medium having a fiber web and solid epoxy compound with a printed image on its surface. The printed image is derived from an ink such as that described above with respect to the kits of this invention. The image comprises a reaction production of the epoxy compound within the recording medium and hardener/crosslinker within the ink formulation. This reaction product is a thermoset polymer resistant to heat, solvents and mechanical alterations, which preferably binds the colorant (pigment and/or dye) of the ink to the fiber web of the recording medium. Such images are resistant to heat in the solvent as described above, as well as bleach. Further embodiments of the recording medium comprise checks, money orders, travel receipts and legal documents.

EXPERIMENTS

Example 1

To prepare a recording medium of the present invention, a filler in an amount of 0–30 parts is mixed with 100 parts bleached hardwood kraft pulp and water. The mixture is subjected to high speed dispersion followed by beating. A glycidyl ether epoxy derived from bisphenol A is added in an amount of about 8 wt. % based on solids. The pulp mixture is formed into a paper recording medium with a basic weight of 5–100 g/m² using a conventional paper making process and equipment. The resulting recording medium can be finished by a calendar.

Example 2

In alternative procedures, raw pulp, such as LBKP beaten to a freeness of 400–500 m/CSF is used as a pulp for the paper recording medium with 5–10 wt. % filler (precipitated calcium carbonate). To the pulp there is added 4 wt. %, based on solids, of a glycidyl ether epoxy resin derived from bisphenol A. The resulting mixture is diluted to produce a paper making material of low concentration (about 0.03%) and using a multi-cylinder Fourdrinier paper machine, the material is formed into a high quality paper having a basis weight of about 30–80 g/m² to produce a recording medium.

Example 3

A waste paper pulp derived from shredded newspaper is mixed with diglycidyl ether epoxy derived from bisphenol A in an amount of 4–6 wt. %, based on solids. The pulp is spread and dried (48 hours) on a glass substrate to form a recording medium.

Example 4

An ink formulation is prepared by mixing a dye, Bromocresol purple, in an aqueous solvent in an amount of 0.1 to 2% based on the total weight of the ink with a dianhydride in an amount of 2–6 wt. % and amine in an amount of about 1 wt. %, based on total weight of said formulation.

Example 5

An ink formulation of Example 4 is applied to the recording medium of Example 3 with a wood applicator. The ink is cured within 1 minute and the image formed is resistant to bleach and acetone and cannot be physically removed without tearing the recording medium.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:
1. A kit for preparing a printed medium which comprises:
   a) a recording medium comprising a fiber web and a solid component of a two component epoxy: hardener/crosslinker pair which are reactive at ambient temperature; and
   b) an ink formulation which comprises a colorant, a carrier for said colorant and a component of said two component epoxy:hardener pair, other than the component within the recording medium.
2. A kit as in claim 1, wherein the epoxy compound is incorporated within the fiber web of the recording medium and the hardener/crosslinker is incorporated within the ink formulation.
3. A kit as in claim 1, adapted for use in an ink jet printer.
4. A kit as in claim 1, wherein the ink formulation is deposited on a ribbon and the kit is adapted for use in an impact printer or dot matrix printer.
5. A kit as in claim 1, wherein the hardener/crosslinker is an amine or anhydride and the amount of hardener/crosslinker in the ink is matched to the amount of epoxy compound to provide a ratio of epoxide groups to a N—H or anhydride group in the range of 0.3:1 to 1.8:1.
6. A kit as in claim 1, wherein the amount of hardener is 2–10 wt. % based on the total weight of said ink formulation and the amount of epoxy compound is 2–10 wt. % based on the total weight of the recording medium.
7. A kit as in claim 1, wherein the epoxy compound is selected from the group consisting of polyglycidyl ethers, polyglycidyl esters poly N-glycidyl compounds and poly-s-glycidyl compounds and the hardener/crosslinker is selected from amines, diamines, anhydrides, diamides, aliphatic polyamines, aliphatic polyamides, dianhydrides, phenol novolak resins, aromatic amines, melamine, urea, phenol aldehyde condensate, polysulfides, and modified amines.
8. A printed medium which comprises:
   a) a recording medium comprising a fiber web and a solid epoxy compound which is reactive with a hardener/crosslinker at ambient temperature; and
   b) a printed image on the surface of said recording medium derived from an ink formulation comprising a colorant, a carrier for said colorant and a hardener/crosslinker for said solid epoxy compound,
   wherein said image comprises a reaction product of said epoxy compound and said hardener/crosslinker.
9. A printed medium as in claim 8, wherein the reaction product of said epoxy compound and said hardener/crosslinker binds said colorant to the recording medium.
10. A printed medium as in claim 8, wherein the epoxy compound has at least 2 oxirane groups and the hardener/crosslinker is an anhydride.
11. A printed medium as in claim 8, wherein the epoxy compound is selected from the group consisting of polyglycidyl ethers, polyglycidyl esters, poly-N-glycidyl compounds and poly-s-glycidyl compounds and the hardener/crosslinker within the ink formulation is selected from amines, diamines, anhydrides, diamides, aliphatic polyamines, aliphatic polyamides, dianhydrides, phenol novolak resins, aromatic amines, melamine, urea, phenol aldehyde condensate, polysulfides, and modified amines.
12. A printer medium as in claim 8, wherein the image is resistant to bleach.
13. A printer medium as in claim 8, which is a check, money order, travel receipt or legal document.

* * * * *

UNITED STATES PATENT AND TRADEMARK OFFICE
CERTIFICATE OF CORRECTION

PATENT NO.   : 5,977,018
DATED        : November 2, 1999
INVENTOR(S)  : Richard B. Moreland.

It is certified that error appears in the above-indentified patent and that said Letters Patent is hereby corrected as shown below:

Column 8, Line 61, "printer" should be -- printed --.

Column 8, Line 63, "printer" should be -- printed --.

Signed and Sealed this

Twenty-seventh Day of March, 2001

Attest:

NICHOLAS P. GODICI

Attesting Officer

Acting Director of the United States Patent and Trademark Office